United States Patent [19]

Lim et al.

[11] Patent Number: 5,754,883
[45] Date of Patent: May 19, 1998

[54] SYSTEM FOR CONTROLLING STOP CLOCK INTERRUPT MODE ACCORDING TO USER SELECTABLE IDLE CONDITION PARAMETERS AND A CONTROL SIGNAL

[75] Inventors: Jung-Gyu Lim; Hee-Duck Park; Shung-Hyun Cho, all of Kyungki-do; Noh-Byung Park, Seoul, all of Rep. of Korea

[73] Assignee: Samsung Electronics Co., Ltd., Kyungki-ku, Rep. of Korea

[21] Appl. No.: 492,492

[22] Filed: Jun. 20, 1995

[30] Foreign Application Priority Data

Jun. 20, 1994 [KR] Rep. of Korea ............... 1994-13919

[51] Int. Cl.$^6$ ............... G06F 1/00; G06F 1/32
[52] U.S. Cl. ............... 395/838; 395/750.04; 395/750.05; 395/557
[58] Field of Search ............... 395/750, 550, 395/800, 150, 750.04, 750.05, 557, 838; 368/10; 364/900, 707, 264.6, 273.5

[56] References Cited

U.S. PATENT DOCUMENTS

| | | | |
|---|---|---|---|
| 4,780,843 | 10/1988 | Tietjen | 364/900 |
| 4,851,987 | 7/1989 | Day | 364/200 |
| 5,189,647 | 2/1993 | Suzuki et al. | 368/10 |
| 5,201,059 | 4/1993 | Nguyen | 395/800 |
| 5,239,652 | 8/1993 | Seibert et al. | 395/750 |
| 5,349,688 | 9/1994 | Nguyen | 395/800 |
| 5,355,501 | 10/1994 | Gross et al. | 395/750 |
| 5,361,392 | 11/1994 | Fourcroy et al. | 395/800 |
| 5,371,693 | 12/1994 | Nakazoe | 364/707 |
| 5,390,350 | 2/1995 | Chung et al. | 395/150 |
| 5,392,437 | 2/1995 | Matter et al. | 395/750 |
| 5,396,635 | 3/1995 | Fung | 395/800 |
| 5,423,045 | 6/1995 | Kannan et al. | 395/750 |
| 5,546,568 | 8/1996 | Bland et al. | 395/550 |
| 5,551,044 | 8/1996 | Shah et al. | 395/750 |
| 5,560,020 | 9/1996 | Nakatani et al. | 395/750 |
| 5,613,135 | 3/1997 | Sakai et al. | 395/800 |
| 5,617,572 | 4/1997 | Pears et al. | 395/750 |

Primary Examiner—Thomas C. Lee
Assistant Examiner—Ki S. Kim
Attorney, Agent, or Firm—Cushman Darby & Cushman IP Group of Pillsbury Madison & Sutro LLP

[57] ABSTRACT

A method and device for controlling a CPU stop clock interrupt of a computer system. The device includes an idle detector and a control processor. A CPU having a stop clock interrupt mode receives a stop clock interrupt signal and initiates and terminates the stop clock interrupt mode according to a logic state of the stop clock interrupt signal. The control processor receives a signal representing an idle condition of the computer system from the idle detector, an alternate signal for idle detector control of the CPU stop clock interrupt mode, and a control signal for forcing the CPU to resume a normal mode by clearing the stop clock interrupt mode. The idle condition can be defined by a computer user according to a selection of predetermined times during which no user inputs are received by the computer system. The method includes monitoring the idle condition signal, monitoring the alternate signal for idle detector control of the stop clock interrupt mode and monitoring the control signal for forcing the CPU to resume a normal mode by clearing the stop clock interrupt mode. The stop clock interrupt signal is output having a logic state corresponding to the logic combination of the monitored signals.

2 Claims, 2 Drawing Sheets

SYSTEM FOR CONTROLLING STOP CLOCK INTERRUPT MODE ACCORDING TO USER SELECTABLE IDLE CONDITION PARAMETERS AND A CONTROL SIGNAL

BACKGROUND OF THE INVENTION (1) Field of the Invention

The present invention relates to a method and device for controlling a CPU stop clock. More particularly, the present invention controls a stop clock interrupt of a computer system including a Static Low-Power Central Processing Unit (hereinafter referred to as SL CPU), such as that manufactured by Intel Corporation, with the use of an idle detector and a control processor.

(2) Description of the Related Art

Computer systems with power-saving functions are well known. Such computer systems enable users to switch the computer from a normal operating mode to a power-off mode, which reduces power consumption if there is no user input for a predetermined period of time, and to switch it back into a resume-mode if there is any input requiring the system to resume normal operations.

An SL CPU such as that manufactured by Intel provides modes, which if selected, can greatly reduce power consumption. Accordingly, it is ideally suited for use in computer systems having power-saving functions.

For example, an SL CPU provides a stop clock interrupt terminal for allowing external control of system clock speed. Conventionally, a system controller chipset, such as that which is further illustrated in the following description, is employed to externally control the clock speed of the SL CPU through the stop clock interrupt terminal.

A conventional stop clock interrupt controller will be described with reference to the FIG. 1 block diagram of a conventional stop clock interrupt controller.

As shown in FIG. 1, the conventional stop clock interrupt controller comprises a system controller chipset 5 (shown as SCC in the drawing), which is very expensive, and SL CPU 4, of which a stop clock interrupt terminal STPCLK is connected with an output terminal of the system controller chipset 5. Operation of the conventional stop clock interrupt controller is described below.

To reduce power consumption during specific operating modes, the system controller chipset 5 is especially designed to generate a stop clock interrupt signal to control the clock speed of the SL CPU 4. When the system controller chipset 5 outputs the stop clock interrupt signal to the SL CPU 4, the SL CPU 4 conserves power by lowering its clock speed.

However, as described above, the conventional stop clock interrupt controller requires a very expensive system controller chipset 5. Therefore, the cost of producing a computer system including a conventional power-saving feature is increased by the cost of conventionally providing that feature.

Furthermore, because the conventional stop clock controller generates a stop clock interrupt only in the specific modes for which it is designed to do so, a user can not voluntarily control the clock speed of the SL CPU 4 for any other purpose through the stop clock interrupt terminal STPCLK of SL CPU 4. Likewise, once an interrupt is generated, a slow clock mode is entered, but resuming a normal mode of the SL CPU 4 can only be implemented in a restricted number of ways since a conventional stop clock interrupt controller is also required to clear the clock interrupt mode.

SUMMARY OF THE INVENTION

Accordingly, it is an object of the present invention to provide a method and device for controlling a CPU stop clock interrupt which solves the problems in the prior art. The stop clock interrupt controller according to one embodiment of this invention is less expensive than the conventional controller which includes the specially manufactured system controller chipset to control a stop clock interrupt.

Another object of the present invention is to provide a method and device for controlling a stop clock interrupt which enables a user to voluntarily control the clock speed of the CPU, through the stop clock interrupt terminal of an SL CPU provided for that purpose.

Another object of the present invention is to provide a method and device for controlling a stop clock interrupt which can force the SL CPU to resume a normal operating mode when it is in the stop clock interrupt mode.

In order to achieve these objects and others, the present invention provides a device which includes an idle detector and a control processor. An SL CPU having a stop clock interrupt mode receives a stop clock interrupt signal and initiates and terminates the stop clock interrupt mode according to a logic state of the stop clock interrupt signal. The control processor receives a signal representing an idle condition of the computer system from the idle detector, an alternate signal for idle detector control of the stop clock interrupt mode and a control signal for forcing the SL CPU to resume the normal mode by terminating the stop clock interrupt mode. The idle condition can be defined by a computer user according to a selection of predetermined times during which no user inputs are received by the computer system.

The method according to the present invention includes monitoring the idle condition signal, monitoring an alternate signal for idle detector control of the stop clock interrupt mode and monitoring the control signal for compulsorily waking up the SL CPU by terminating the stop clock interrupt mode. The stop clock interrupt signal is output having a logic state corresponding to the logic combination of the monitored signals.

DETAILED DESCRIPTION OF THE PREFERRED EMBODIMENTS

A preferred embodiment of the present invention will become apparent from a study of the following detailed description, when viewed in light of the accompanying drawings.

Figure 1:
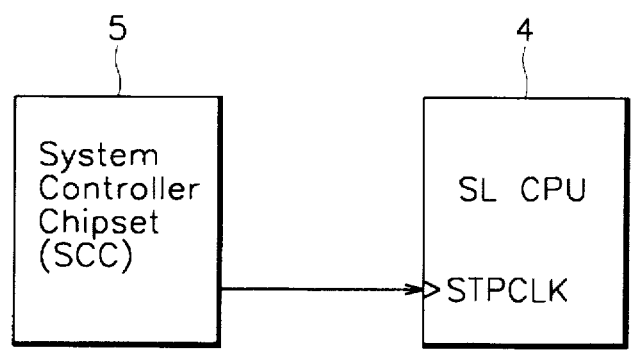
FIG. 1 is a block diagram of a conventional stop clock interrupt controller.
Figure 2:
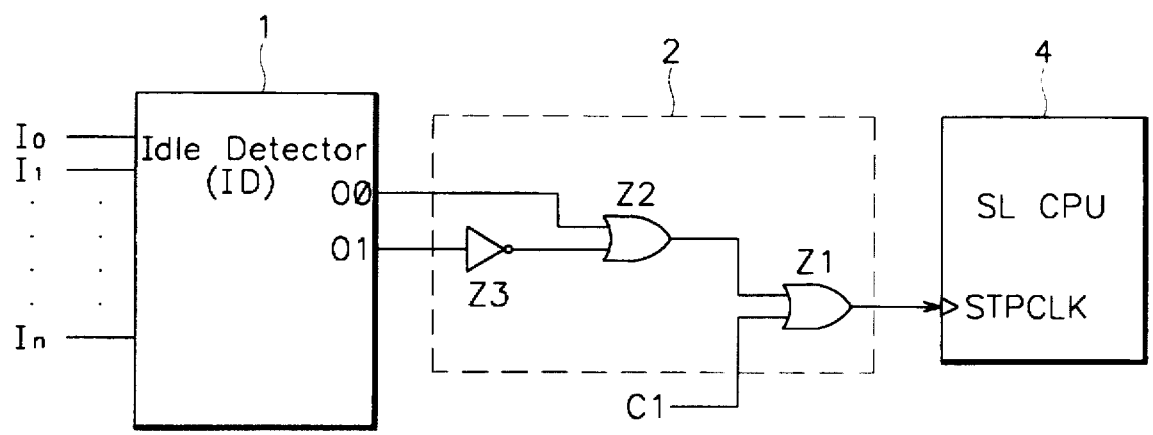
FIG. 2 is a block diagram of a stop clock interrupt controller provided in accordance with a preferred embodiment of the present invention.

As shown in FIG. 2, according to a preferred embodiment of the present invention, the stop clock controller includes an idle detector 1, a control processor 2, and an SL CPU 4 which is, for instance, a microprocessor manufactured by Intel Corporation.

The idle detector 1, when the SL CPU 4 converts into its specific power-saving mode, uses signals $I_0$–$I_n$ as input signals for deciding whether an operating condition of the computer system requires the CPU to switch out of the mode. The idle detector 1 outputs signals through a main output channel O0 and an alternative output channel O1, respectively.

The control processor 2 includes an inverter Z3, which receives the alternate signal from the alternative channel O1 of the idle detector as an input; a first OR gate Z2, which receives an output signal from the inverter Z3 as one input, and which receives the signal indicating an idle condition according to the detection of input signals $I_0$–$I_n$ from the main output channel O0 of the idle detector as the other input; and a second OR gate Z1, which receives an output signal from the OR gate Z2 as one input, and which receives the control signal C1, outputted from a system that is controlled voluntarily by the user, as the other input.

The SL CPU converts to the stop clock interrupt mode when the stop clock interrupt signal having a logic low level from the control processor 2 is inputted to the stop clock terminal STPCLK.

Figure 3:
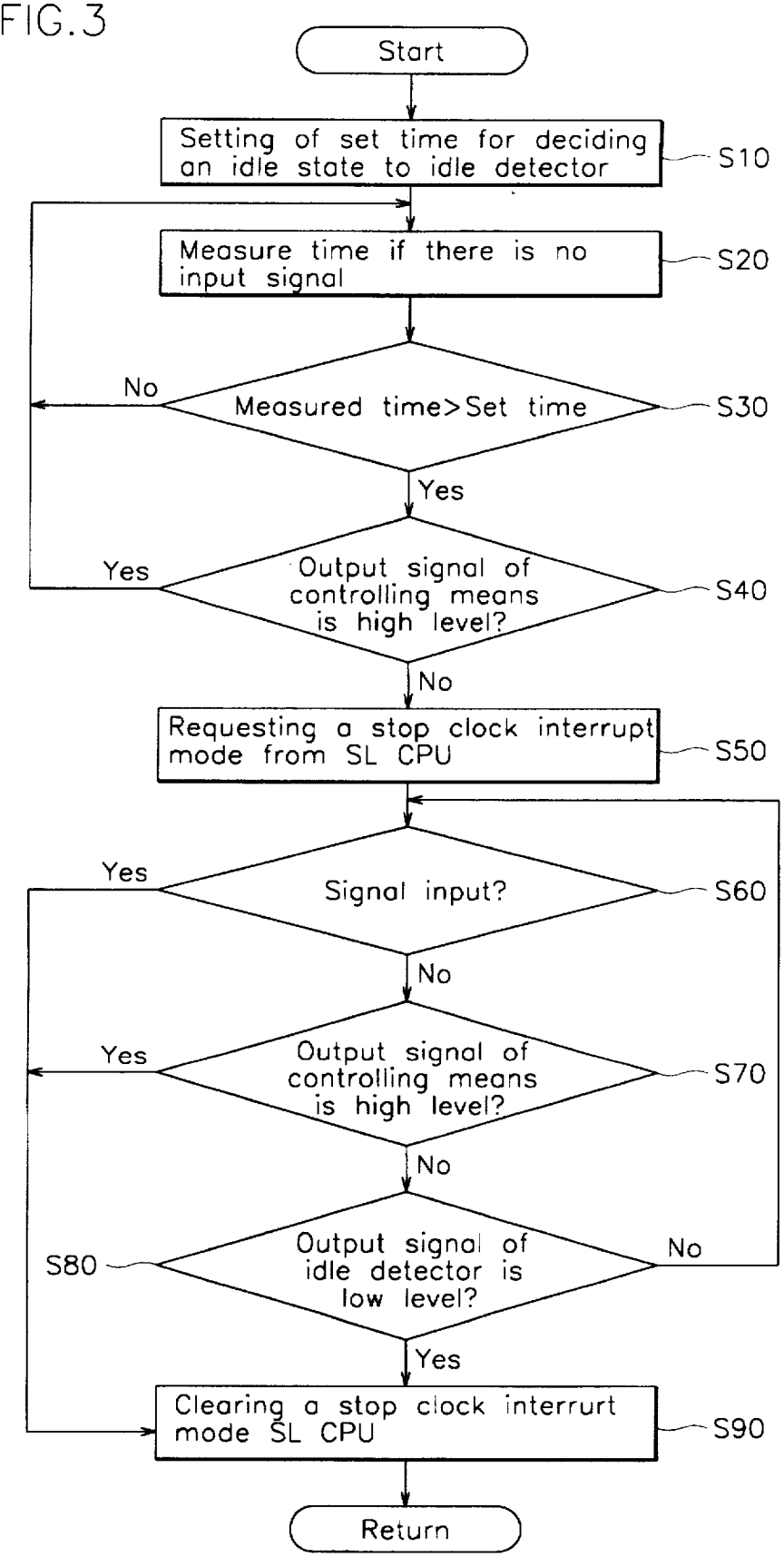
FIG. 3 is an operation flowchart of a method for controlling a stop clock interrupt in accordance with a preferred embodiment of the present invention.

FIG. 3 is an operation flowchart of a method for controlling a stop clock interrupt in accordance with a preferred embodiment of the present invention.

As shown in FIG. 3, a method for controlling a stop clock includes procedures both for requesting a stop clock interrupt mode of the SL CPU and for terminating a stop clock interrupt mode.

The method for initiating a stop clock interrupt mode according to the preferred embodiment is as follows.

In a first sub-step S10, a user directly sets up idle time periods with binary codes indicating the idle detection time used by the idle detector 1. For example, the binary codes can designate system idle time intervals for requesting the stop clock in increments of 5 minutes from an idle time range of 5 minutes to 75 minutes.

In a second sub-step S20, the idle detector monitors the presence of input signals $I_0$–$I_n$ into the computer system, and measures the idle times during which no user inputs are received.

In a third sub-step S30, the measured idle times are compared with the set times selected by the user for deciding whether to invoke the idle state of system. If the idle time exceeds the set times, processing advances to the next step S40. Otherwise, processing returns to the second step S20 for sensing the input signals $I_0$–$I_n$ of the idle detector 1 if the measured idle times are insufficient for deciding to invoke the idle state of the system.

In a fourth sub-step S40, it is determined if the idle condition signal is low, the alternate signal is high, and the control signal is low. If this condition is not satisfied, processing returns to step S20; otherwise, processing advances to the next step.

In a fifth sub-step S50, the stop clock interrupt signal is inputted to stop clock interrupt terminal STPCLK of the SL CPU if the idle condition signal is low, the alternate signal is high, and the control signal is low as determined in the fourth sub-step S40. Accordingly, the stop clock interrupt from SL CPU 4 is requested, and the system mode is converted to the stop clock-interrupt mode through the feature of the SL CPU 4.

The method for terminating a stop clock interrupt mode according to the preferred embodiment is as follows.

In the step S60, while the SL CPU maintains the stop clock interrupt mode, if input signals $I_0$–$I_n$ are sensed by the operation of the idle detector, processing shifts to step S90, which clears the stop clock interrupt mode, because the idle condition signal is high when there exists input signals $I_0$–$I_n$. Otherwise, processing advances to next step S70.

In the step S70, while the SL CPU maintains the stop clock interrupt mode, if the control signal C1 has the low level signal, processing advances to step S80. Otherwise, processing shifts to the step S90, which clears the stop clock interrupt mode, if the control signal C1 has a high level signal.

In the step S80, the alternate signal of the alternative output channel O1 from the idle detector 1 is sensed. Processing advances to the next step S90, which clears the stop clock interrupt mode, if the output signal from alternative output channel O1 is at a low level. Otherwise, processing returns to step S60.

As described before, in the step S90 of the method for controlling the stop clock, after any of the above-described steps to clear the stop clock interrupt mode are sensed, the SL CPU 4 operates normally by clearing the stop clock interrupt mode of the SL CPU 4.

The operation of the method and device for controlling a stop clock interrupt according to a preferred embodiment of the present invention is described more fully below.

During the set times for deciding the idle state of the system, if there are no input signals $I_0$–$I_n$, the idle detector 1 automatically generates output signals for detecting an idle state through two channels O0, O1, respectively. Under this condition, for example, the main output channel O0 outputs a low level signal as an idle condition signal. The alternative output channel outputs a high level signal as an alternate signal.

As shown in Table 1, the user can set up the set times for deciding an idle state, with a binary numeral having four digits, by using four jumpers (not shown in drawings) per channel, respectively.

The input signals $I_0$–$I_n$ of the idle detector 1 are used to determine whether the SL CPU should switch from a normal operating mode into a stop clock interrupt mode to reduce power consumption. The input signals represent user inputs via Input/Output devices such as a keyboard or mouse.

Although the SL CPU 4 is activated according to the receipt of one signal among the input signals $I_0$–$I_n$, the user can voluntarily select the same or another signal applied to the system among the input signals $I_0$–$I_n$.

By way of illustration, if the user sets up four jumpers to select a binary numeral 0111, the idle detector 1 decides an idle state of the system when there are no input signals $I_0$–$I_n$ in the system for 35 minutes, and outputs an output signal from the above step through the two channels O0 and O1, respectively.

The two channels O0 and O1 have high level signals when the idle detector 1 does not generate the output signal. If the idle detector 1 decides an idle state of the system, while the main output channel O0 is set to a low level signal, the alternative output channel O1 maintains a high level signal mainly according to voluntary control by a user.

The control processor 2 enables such user control operation of the SL CPU 4 by the passing output of the alternative output channel O1 through the inverter Z3, and making a low level signal of a signal pass through the first OR gate Z2 of which one side terminal is connected with an output terminal of the inverter Z3 and of which the other side terminal is connected with an output terminal of the main output channel O0.

Consequently, the low level signal is inputted to one side terminal of the second OR gate Z1, and because the control signal C1 has a low level signal when it is not voluntarily input by the user, a signal having a low level is input to the stop clock interrupt terminal STPCLK of the SL CPU 4, and the stop clock interrupt mode is requested from the SL CPU 4.

As described above, in case the user wants to reduce power consumption by converting the SL CPU 4 into its special mode, the SL CPU 4 sets up the stop clock interrupt mode, senses the input signals $I_0-I_n$ of the idle detector 1, and thus is controlled by the idle detector 1 when there are no input signals $I_0-I_n$.

When the SL CPU 4 is a stop clock interrupt mode, the way to clear the mode is to reverse logically a stop clock-interrupt signal for requesting the stop clock interrupt mode when deciding an idle state of the system of the idle detector 1.

If the input signals $I_0-I_n$ are inputted to the idle detector 1 while the CPU is maintaining the stop clock interrupt mode, the idle detector 1 outputs a high level signal to the main output channel O0 because the system state is not idle. Consequently, the first OR gate Z2 of the processing means 2 outputs a high level signal which is inputted to one side terminal of the second OR gate. The signal through the second OR gate Z1 is inputted to the stop clock interrupt terminal STPCLK of the SL CPU 4. As a result, the SL CPU 4 clears the stop clock interrupt mode.

When the SL CPU 4 is in a stop clock interrupt mode, another way to clear the mode is to use the alternative output channel O1 of the idle detector. The alternative output channel O1 has a high level signal when there is no output signal from the idle detector 1, and outputs a low level signal in case the channel O1 can clear the stop clock interrupt mode by using the main output channel O0. For example, the system operates a timer of the idle detector without keyboard input by a user, so that the CPU returns to a normal state by using the alternative output channel O1 of the idle detector.

The control processor 2 reverses the low level signal from the alternative output channel O1, and outputs a high level signal because the signal reversed through the control processor 2 is a high level signal. As a result, the SL CPU 4 clears the stop clock interrupt mode.

When SL CPU 4 is in a stop clock interrupt mode, the last way to clear the mode is to use the control signal C1 of the control processor 2. In cases where the idle detector 1 can not control the stop clock interrupt mode, the control signal C1 outputs a high level signal when the user controls the signal C1 to be a high level signal. As a result, the SL CPU 4 clears the stop clock interrupt mode, and returns to a normal operating mode.

According to a preferred embodiment of the present invention, by using the idle detector to output a special signal when there is no input signal during a set time for deciding an idle state of the system, and a control processor made of simple logical elements, the stop clock controller simply and inexpensively enables the computer system to convert to the stop clock interrupt mode or to activate the SL CPU while it maintains the stop clock interrupt mode. Consequently, the present invention can provide a method and device for effectively controlling a stop clock interrupt.

While the present invention has been described in detail with reference to the preferred embodiment, those skilled in the art will appreciate that various modifications and substitutions can be made thereto without departing from the spirit and scope of the present invention as set forth in the appended claims.

What is claimed is:

1. A computer system, comprising:
    a CPU having a stop clock interrupt mode which is controlled by a state of an externally generated stop clock interrupt signal received by said CPU;
    an idle detector which receives input signals and user idle condition parameters and which detects an idle condition of said computer system according to said input signals and said user idle condition parameters, said idle detector outputting an idle condition signal corresponding to said detected idle condition, said idle detector including selecting means for permitting a user to select said user idle condition parameters from among a plurality of idle condition parameters; and
    a control processor, which receives said idle condition signal of said idle detector and a control signal for preventing said stop clock interrupt mode, and outputs said stop clock interrupts signal to said CPU according to logic states of said idle condition signal and said control signal, wherein:
    said idle detector includes two channels for outputting said idle condition signal, a first channel outputting a first idle signal, and a second channel outputting a second idle signal, said first idle signal being output in accordance with the presence of input signals within a first predetermined period of time, said second idle signal being output in accordance with the presence of input signals within a second predetermined period of time.

2. A computer system having a normal operating mode and a stop clock interrupt mode, comprising:
    an idle detector that outputs a first signal in a first logic state when said computer system is in said normal operating mode and has not been used for a first time interval, outputs said first signal in a second logic state when said computer system is in said stop clock interrupt mode and is being used, and outputs a second signal when said computer system is in said stop clock interrupt mode and said computer system has not been used for a second time interval;
    a CPU that receives an externally generated stop clock interrupt signal, said normal operating mode and said stop clock interrupt mode being controlled in accordance with first and second logic states of said stop clock interrupt signal, respectively; and
    a controller that receives said first and second signals and generates said stop clock interrupt signal,
    wherein said controller changes said stop clock interrupt signal from said first logic state to said second logic state for setting said stop clock interrupt mode when said first signal in said first logic state is received, and
    said controller changes said stop clock interrupt signal from said second logic state to said first logic state for setting said normal operating mode when said first signal in said second logic state is received, or when said second signal is received.

* * * * *